H. J. HANSON.
POTATO CUTTER.
APPLICATION FILED JUNE 8, 1921.
1,424,474.
Patented Aug. 1, 1922.
3 SHEETS—SHEET 1.
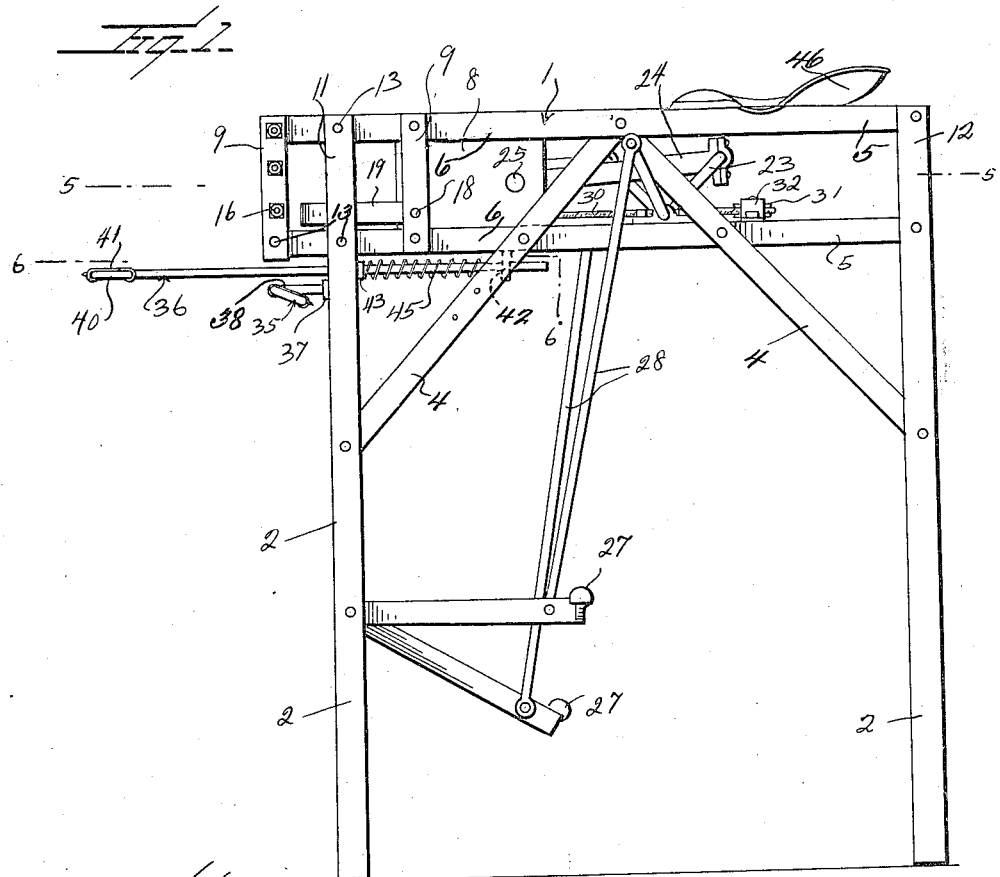
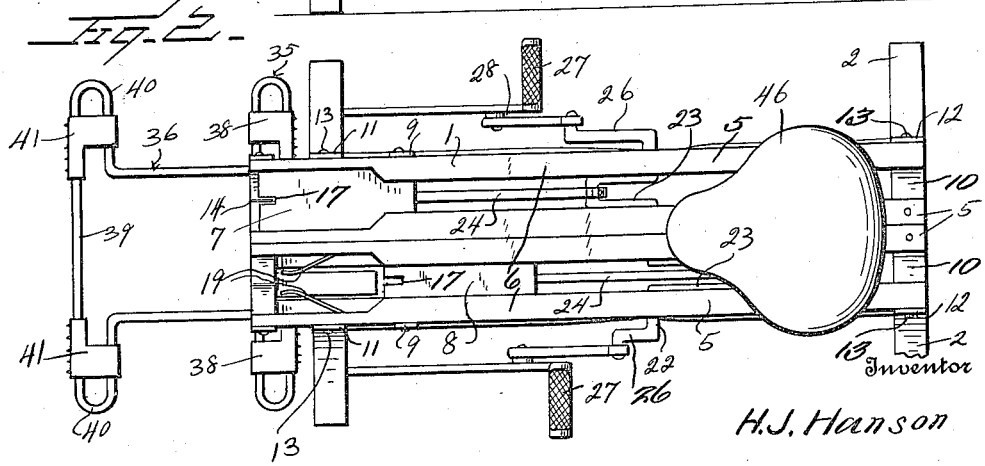
Inventor
H. J. Hanson
By Watson E. Coleman
Attorney H. J. HANSON.
POTATO CUTTER.
APPLICATION FILED JUNE 8, 1921.
1,424,474.
Patented Aug. 1, 1922.
3 SHEETS—SHEET 2.
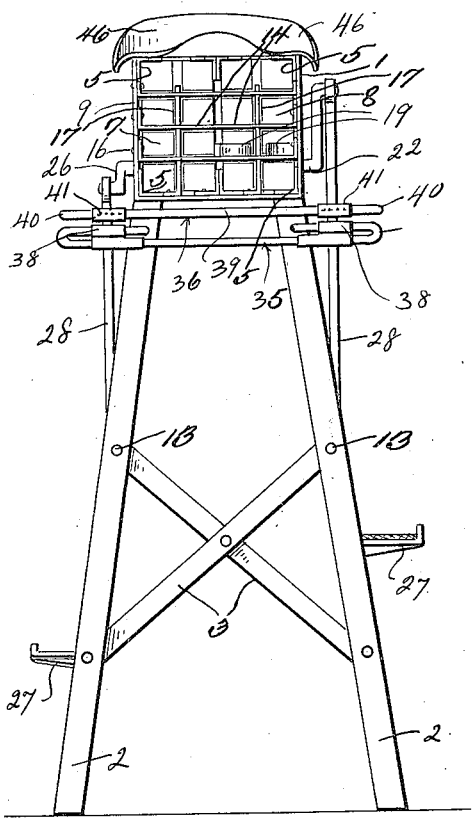
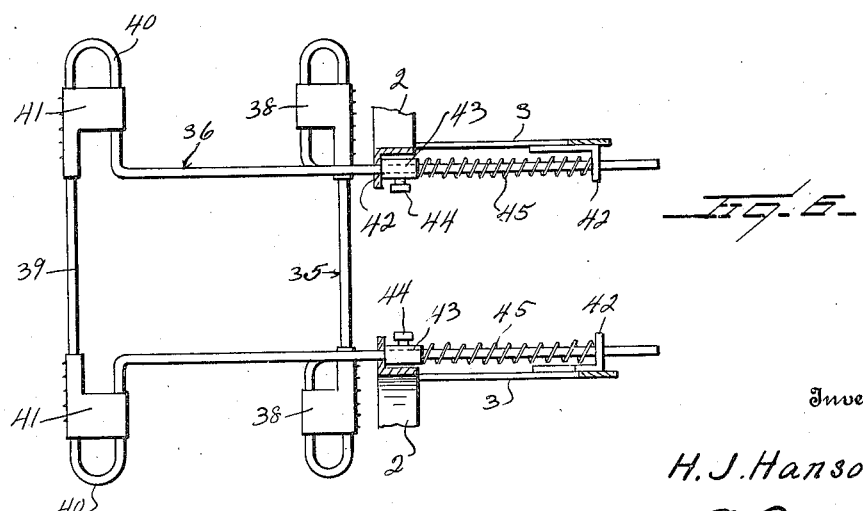
Inventor
H. J. Hanson
By Watson E. Coleman
Attorney

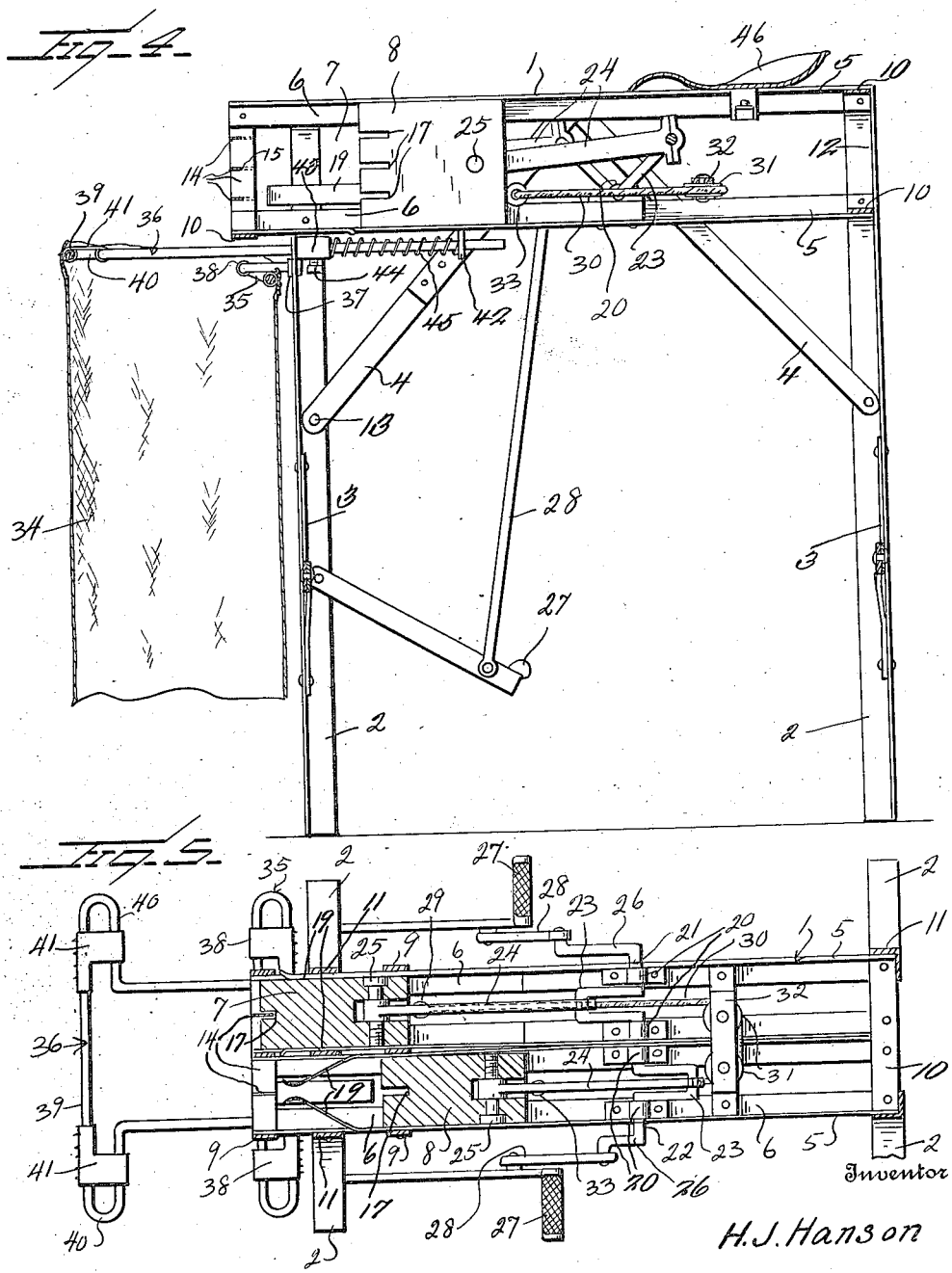

UNITED STATES PATENT OFFICE.

HARRY J. HANSON, OF AMENIA, NORTH DAKOTA.

POTATO CUTTER.

1,424,474. Specification of Letters Patent. Patented Aug. 1, 1922.

Application filed June 8, 1921. Serial No. 475,983.

*To all whom it may concern:*

Be it known that I, HARRY J. HANSON, a citizen of the United States, residing at Amenia, in the county of Cass and State of North Dakota, have invented certain new and useful Improvements in Potato Cutters, of which the following is a specification, reference being had to the accompanying drawings.

It is the purpose of the present invention to provide a device of this general character particularly adapted for cutting seed potatoes, and wherein the frame having guides for the reception of moving plungers are employed, in combination with potato holding spring jaws arranged in the guides, whereby as the plungers are moved forward, the potatoes are forced from between the jaws toward the intersecting cutting knives. The potato is forced between the knives, cutting the same into a plurality of sections, the eyes in the parts of the potatoes being adapted to sprout and take root, when planted, to start the growth of other potatoes.

Another purpose embodies the provision of means for alternately operating the plungers, for forcing the potatoes from between the jaws.

Still another purpose involves the provision of an improved sack or bag holder adjacent the cutting knives, for the reception of the sections of the seed potatoes, as the potatoes are cut.

A further purpose is the provision of a sack or bag holder, which is adjustable, so as to fit different size sack openings.

A still further purpose is the provision of a sack or bag holder spring tensioned, in order to hold the sack or bag in place.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of the improved seed potato cutter constructed in accordance with the invention.

Figure 2 is a plan view of the same.

Figure 3 is a view in end elevation, showing the cutting knives, and illustrating the bag or sack for the reception of the sections of potatoes.

Figure 4 is a longitudinal sectional view through the potato cutter, showing one of the plungers, for forcing the potatoes from between the spring jaws, and illustrating the bag or sack for the reception of the sections of potatoes.

Figure 5 is a horizontal longitudinal sectional view on line 5—5 of Figure 1, showing both plungers, whereby potatoes may be forced alternately toward and between the knives.

Figure 6 is a horizontal sectional view on line 6—6 of Figure 1 at a point below the guides or frame, so as to more clearly show the adjustable sack holder.

Referring to the drawings, 1 designates the frame, which is supported upon suitable legs 2, which are reinforced by the braces 3 and 4.

The frame is elongated, and comprises a plurality of longitudinal angle bars 5, which are relatively disposed, to provide guides 6 for the reciprocating plungers 7 and 8. The angle bars are relatively reinforced by the vertical braces 9 and the transverse braces 10, and also by means of extensions 11 and 12 of the legs and the braces 4. The various parts of the frame, the legs and the reinforcing braces are fastened together by suitable bolts, rivets or the like 13.

Arranged at the outlet ends of the guides is a plurality of transverse and vertical intersecting cutting knives 14. These cutting knives are centrally recessed in opposed relation as shown at 15, in order that they may be disposed in intersecting positions. Furthermore the knives are secured at 16 to certain of the vertical braces of the frame. The forward ends of the plungers 7 and 8 are provided with intersecting recesses or channels 17 conforming to and adapted to engage the knives. The channels or grooves of the plungers correspond to the arrangement of the knives, so as to force the potatoes between the knives, for cutting the potatoes in sections.

Fastened to certain of the vertical braces 9 of the frame as at 18 are spring jaws 19, which are arranged relatively convergent, for the reception of seed potatoes, to hold them in position.

Mounted in bearings 20 of suitable blocks which are bolted to the frame are crank shafts 21 and 22, the center crank arms 23 of which have connected thereto pitman rods 24, which are in turn pivotally connected at 25 to the plungers 7 and 8. The outside crank arms 26 are connected to the foot treadles 27 by means of the rods 28. The treadles are pivotally mounted upon the forward legs of the machine.

Connected to the plunger 7 as at 29 is a cable 30, which passes over the pulleys 31 (which are mounted in the support 32) and has its other end connected at 33 to the plunger 8. Obviously by means of the cable and the foot treadles, the plungers are reciprocated alternately toward and from the knives. The downward movements of the pedals impart forward movements to the plungers, and as one plunger moves forward, the cable retracts the other plunger, and vice versa.

As the plungers reciprocate in their guides, and as the potatoes are dropped between the spring jaws, the potatoes are forced alternately toward and between the cutting knives, the sections thereof dropping into a suitable sack, such as indicated at 34.

A suitable sack holder is provided, and it comprises the fixed and movable jaws 35 and 36. The fixed jaw consists of a single rod fastened to the upper parts of the forward legs of the frame as shown at 37, the rod being extended forward, bent laterally in opposite directions, then looped, and the rod disposed rearwardly, the transverse part of the loop of the rod extending across the face of the upper parts of the legs, thus providing a jaw, over which the sack engages in order to be held in position. The opposite parts of the wire forming the fixed jaw are fastened together by means of the plates 38.

The movable jaw for the potato sack comprises a rod adapted to form the forward loop 39 having lateral parts 40, to engage the sack to be supported. The opposite sides of the lateral parts or loops 40 are braced by the plates 41. The end portions of the rod forming the movable jaw are mounted in guides 42 of the forward legs and certain of the braces. Collars 43 are fastened adjustably on the opposite arms of the forward jaw of the holder by means of the set screws 44. Interposed between the collars 43 and certain of the guides 42 are coiled springs 45, each act to force the movable jaw forward in engagement with the mouth of the bag. The bag or sack is open, and the margin of the mouth of the bag overlaps or engages the fixed and movable jaws of the sack holder, as shown in the drawings to hold the same in position. Obviously the collars 43 may be adjusted, in order to increase or decrease the tension of the coiled springs.

A seat 46 is mounted upon the rear part of the frame, for the purpose of supporting an operator, whose legs extend down on the opposite side of the frame, in order to engage the treadles, whereby the plungers may be reciprocated for the purpose set forth.

The invention having been set forth, what is claimed as being useful is:

1. In a seed potato cutter, a frame having discharge channels constituting guides, the discharge ends of the guides provided with intersecting vertical and transverse cutting knives, resilient jaws mounted in said guides with their resilient terminals immediately adjacent the knives, constituting yieldable abutments, against which the potato bears prior to being cut by the knives, a pair of plungers mounted to reciprocate in the guides and having their forward faces provided with intersecting transverse and vertical grooves corresponding to the intersections of the knives, so that the forward faces of the plungers may protrude partially between the knives, independently revoluble crank shafts operatively connecting with the plungers for reciprocating them, means for operating the crank shafts, and means operatively connecting said plungers, to insure alternate movements of the plungers.

2. In a seed potato cutter, a frame having parallel guide channels provided with potato cutting means at their discharge ends, plungers mounted in the guide channels for reciprocating movements, whereby they may cooperate with the cutting means for cutting potatoes interposed between the plungers and the cutting means, independently revoluble members operatively connecting with the plungers for reciprocating them, means for operating the independently revoluble members, and means connecting the plungers to insure alternate movements of the plungers.

3. In a seed potato cutter, a frame having parallel guide channels provided with potato cutting means at their discharge ends, plungers mounted in the guide channels for reciprocating movements, whereby they may cooperate with the cutting means for cutting potatoes interposed between the plungers and the cutting means, independently revoluble members operatively connecting with the plungers for reciprocating them, means for operating the independently revoluble members, pulleys mounted on the frame, and a cable engaging over the pulleys and operatively connecting the plungers to insure alternate movements of the plungers.

4. In a seed potato cutter, an elongated rectangular frame composed of longitudinally extending angle irons, said frame having parallel guide channels, said angle irons constituting guides in said channels, the discharge ends of the guide channels having cutting knives, plungers mounted to reciprocate in the angle iron guide channels and having their forward faces conforming to and engaging between the cutting knives, independently operable members operatively connecting with said plungers for reciprocating them alternately toward and from the guides, means for operating said independently operable members, and means operatively connecting said plungers to insure alternate movements of said plungers.

In testimony whereof I hereunto affix my signature.

HARRY J. HANSON.